March 24, 1953 — R. D. ROLLIE ET AL — 2,632,653
CONVERTIBLE SHOPPING AND TRAVEL CART
Filed April 4, 1949 — 2 SHEETS—SHEET 1
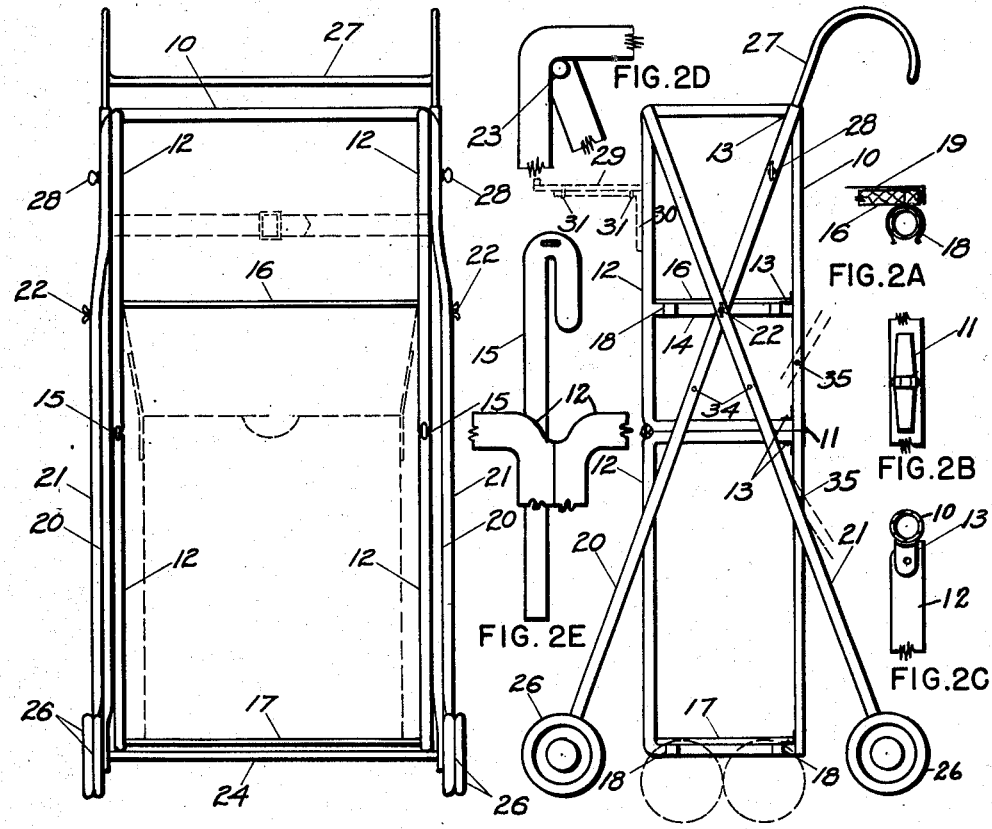
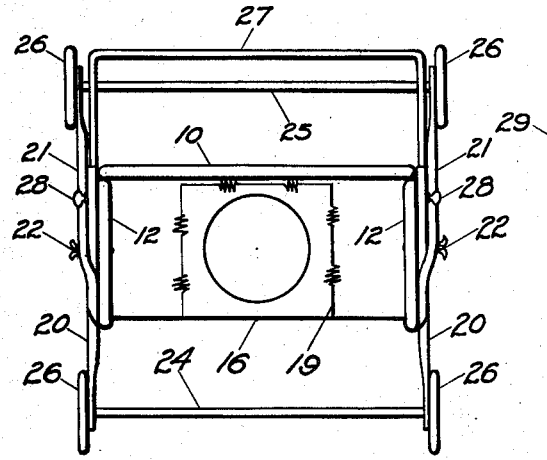
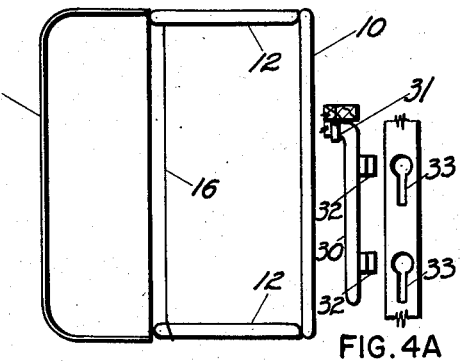
INVENTORS
ROBERT D. ROLLIE
ADA E. ROLLIE
BY Philip M. Stutrud
ATTORNEY March 24, 1953  R. D. ROLLIE ET AL  2,632,653
CONVERTIBLE SHOPPING AND TRAVEL CART
Filed April 4, 1949 2 SHEETS—SHEET 2

INVENTORS
ROBERT D. ROLLIE
ADA E. ROLLIE
BY Philip M. Stutrud
ATTORNEY

Patented Mar. 24, 1953

2,632,653

UNITED STATES PATENT OFFICE 2,632,653

CONVERTIBLE SHOPPING AND TRAVEL CART

Robert D. Rollie and Ada E. Rollie, St. Paul, Minn.

Application April 4, 1949, Serial No. 85,342

4 Claims. (Cl. 280—31)

This invention relates to convertible shopping and travel carts, upon which, a small child may be transported, and which may be collapsed into small space in addition to being convertible to several other devices for the child's use.

Many shopping carts and go-carts have been devised. Of these, many are so low that the child is in continual danger in crowded stores. Some, like those provided in self-service markets, are of high construction but are of bulky proportions and extremely heavy. These of course cannot be taken from the store to an automobile, so there is the problem of carrying the child and then the groceries. If the store is in the neighborhood, a conventional baby buggy is likely used, which again is too large to take into the market and the same problem arises. Except for some small low carts, none are collapsible into a compact space. None have convertibility into other devices for the child's use. Without any cart, the child's mother or nurse has a difficult time in carrying or leading the child while shopping. Only one hand is free for gathering the merchandise, and the child is continually interfering with the shopping or business in the store, by handling merchandise and in many other ways. With any of the carts available, it is difficult to do the shopping without interference with shelves and other occupants, as too much floor space is required. Frequently, also the child is in danger from the crowds. Unless the cart is collapsible, it is difficult to transport in an automobile for return home after the shopping trip. It is also difficult without such a cart for the adult in other situations besides shopping. In traveling, it is extremely difficult without a light compact cart, that can be used, collapsed in small space when not used, and which may be used in other ways to provide for the child's needs.

An important object of our invention is to provide a shopping and travel cart of light weight, requiring a small amount of floor space, but of a height and stability to safeguard the child in crowded places, and also provide ample space for parcels and articles.

Another important object is to provide such a cart, which is collapsible, and by reason of the manner in which the collapsibility is provided, can be converted to several devices for the child's use.

Another object is to provide such a cart of durable light weight construction but at a reasonable cost.

Other objects will be apparent from the description and appended claims.

For a full disclosure of our invention, reference is made to the description following and to the drawing, in which—

Fig. 1 is a front elevational view of our cart, which also shows in dotted outline, a safety belt in position and a shopping bag hung in place and resting on a shelf.

Fig. 2 is a side elevational view and showing structural details on enlarged scale by Figs. 2A, B, C, D and E respectively, and which Fig. 2 also shows in dotted outline, wheels in retracted position, a detachable food tray in position, and position of wheel standards, when cart is converted to a baby carriage.

Fig. 3 is a plan view, which also shows construction of seat to convert framework of cart into a child's training seat.

Fig. 4 is a plan view of the detachable food tray attached for high chair use, and showing structural details on enlarged scale by Fig. 4A.

Figure 11:
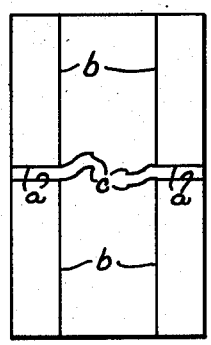
Fig. 11 is a diagrammatic representation of the fabric cover, to indicate how it is applied to the foldable framework.

Referring now to the several figures of the drawing, the reference character 10 indicates a two sectional back member, the two sections being substantially U-shaped and similar except in reverse position, formed from round tube stock and joined to each other at their open ends by two strap hinges 11. These hinges as shown in detail of Fig. 2B permit the square cut ends of the material to bear firmly on each other. The material used for the back and entire framework of the cart is preferably hollow tubing made of light metal, but it would also be practical to construct same of solid rods, metal sheets, plywood or the like. Four substantially U-shaped and similar side members 12 are provided, each being equal in height at its open side to each section of said back member and of a width of half the width of the back member, so that two side members may be folded flat against the back member. These are secured to the back member at their open sides by pintle and bracket hinges 13. The bracket is fixedly attached to the back member, with the pintle upright through the bracket and the end of the tubing of the side member. These hinges are positioned interiorly of the side members extending at right angles from the back member, and the ends of the tubing of the open sides of the side members fit tightly against the back member except for a radius cut on one side, as shown in detail of Fig. 2C. This provides firm bearing against the back member, and makes it impossible to fold the side members except in the proper manner against the back member. In the two top side members, an additional cross piece 14 is provided for a purpose to be subsequently explained. This is preferably secured by welding at the front end and by another pintle and bracket hinge 13 to the back member. It is obvious how the back member folds together and then how the respective side members fold against the two sections of the back member, so that the frame work folds into a compact four ply relation. To form a wall construction for the back and sides, canvas or some such substantial fabric is used as illustrated in Fig. 11. This is formed on the order of a book cover for the top half and the bottom half respectively. It may be in two pieces or it may be in one piece with the back part continuous. In this cover, grommets are provided for bolts passing through, sewed edge slits to accommodate other fastening means, and ample tie straps for securing same to the frame work. It can be easily removed for cleaning or replacement. When in extended position, the framework is locked in place by two similar keys 15. These keys enter bores, provided in contiguous tubes of side members, and secure an upper and a lower side member together. A ridge is provided on each side at the loop end, to furnish a good finger grip for removal. To maintain an open and normal position of the side members with respect to the back, a child's seat 16 and a shopping bag shelf 17 are secured to the side members by spring clips 18 engaging the tubing, as shown in detail of Fig. 2A. The seat 16 and the shelf 17 are preferably made of plywood, and are identical except for provision in seat 16 for use as a training seat. A light metal sheet 19 with flanged edges, as shown in detail of Fig. 2A, fits over the seat 16 when not so used, and a similar sheet fits over the shelf 17 to withstand severe shopping service. Conventional covering and padding may be provided for the seat as desired.

To provide vehicular means, wheel standards 20 and 21 are provided, extending respectively to the front and back for stability. These are the same except for bending for clearance, and those extending to the front accommodating a handle to be subsequently described. A bolt 22 with a wing nut secures the two wheel standards at their intersection with the cross piece 14 of the side members. As previously stated, a grommet is provided in the canvas cover on each side for this bolt to pass through. Bracing pins 23 as shown in detail of Fig. 2D, are provided at the top end of each of the wheel standards 20 and 21, to engage interiorly of the corners of the top side members. By this engagement, the wheel standards are firmly secured to the frame work, when the wing nuts of the bolts 22 are tightened. Axles 24 and 25, which are the same except for a small difference in length, are provided respectively for the front and rear. These axles are fixedly secured in bores in the lower extremities of the wheel standards. The tubing of the standards is flattened to provide ample width for the axle bore and provide smooth construction. Wheels 26, with ball bearings and rubber rims, are provided at respective ends of the axles. Although ample stability is provided, a small amount of floor space is required for the cart. It will be observed that the wheels may be readily brought into a retracted position, as shown in dotted outline in Fig. 2, by loosening the wing nuts on the bolts 22 sufficiently, so that the bracing pins 23 may be disengaged from within the corners of the top side members, permitting pivotal movement about the bolts 22. The wheels and standards are also readily dismantled from the frame work by removing the bolts 22, for conversion to other devices, as will be subsequently explained. A handle 27 is provided, by bending from a single piece of rod, to fit within the tubing of the standards 20. This is adjustable to the desired length from within the tubing, and is clamped in place on each side by a thumb screw 28. Ends of the handle are slotted to permit same to extend within the tubing beyond the point of the bolt 22. A food tray 29, preferably of plywood and as shown in Fig. 4, is provided in a position as indicated in dotted outline in Fig. 2. This is supported by brackets 30, which are foldable flat against the tray, by means of loose fitting clamps 31. These clamps encompass the horizontal portion of the bracket 30, permitting the vertical portion to be collapsed, when not in use. Projections 32 on the brackets engage suitable openings 33 in front side of tubing of upper side members. The tray may thereby be easily placed or removed. By use of this tray, the cart serves well for use as a high chair.

It is apparent that the cart may be readily dismantled and folded into a small bundle, that can be strapped to a suit case or otherwise transported, taking up very little space. The frame work can also be folded up without removing the canvas cover. A fabric bag may be provided in which to pack the seat 16, shelf 17 and food tray 29, so that these may conveniently be included in the bundle.

Figure 5:
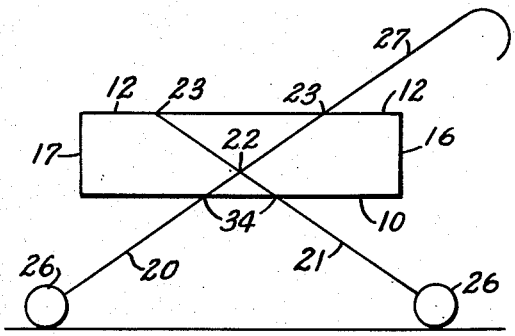
Figs. 5, 6, 7, 8 and 9 are diagrammatic representations of convertibility, respectively into a baby carriage, a child's training seat, a hanging cradle, a seat in an automobile and a basinette or a bathinette.
Figure 6:
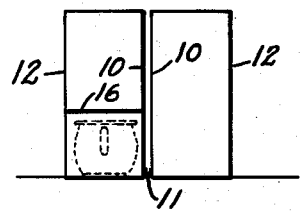

It is also apparent, that by reason of the manner in which the members of the frame work are joined together and the wheel standards are attached thereto, that the cart can readily be converted to other devices for the child's use. This meets a need for people living in trailer coaches and small apartments with too limited a space for several different devices. As illustrated diagrammatically in Fig. 5, it can be converted into a baby carriage. This is accomplished by matching holes 34 in the wheel standards with holes 35 in the back member, as indicated in dotted outline in Fig. 2, and securing the respective parts by bolts with wing nuts similar to bolt 22. The bolt 22 then only serves to hold the wheel standards together, and the bracing pins 23 at the top of the wheel standards engage on the under side of the top tubing. The seat 16 is reversed and shifted to the end opposite to shelf 17 and attached in a similar manner. A cover of matching fabric may be provided for each of the ends. The handle 27 may be pulled out to a length suitable for such carriage and set with the thumb screws 28 shown in Figs. 1, 2 and 3. With the wheel standards detached, the frame work may be converted into a child's training seat as illustrated in Fig. 6. This is accomplished by removing the metal sheet 19 from the seat 16 in its normal position. It will be observed that the device has good stability, provided by the two side members 12 extending outwardly on the opposite side.

Figure 7:
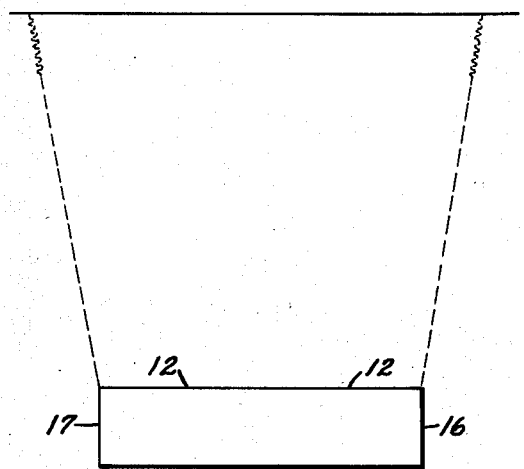
Figure 8:
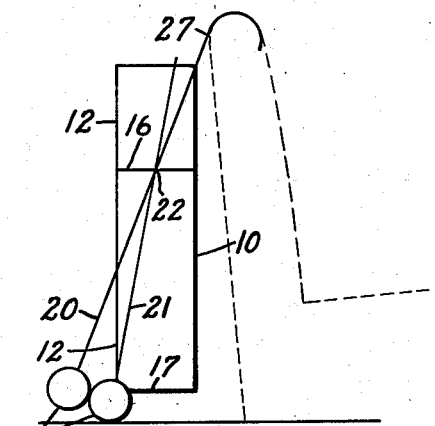
Figure 9:
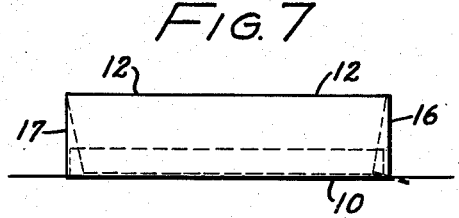
Figure 10:
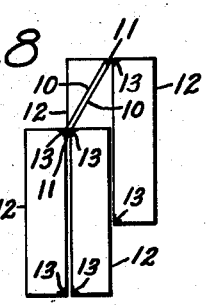
Fig. 10 is a diagrammatic representation, showing how framework of cart is foldable into a compact four ply relation.

As illustrated in Fig. 7, a hanging cradle may be provided by removing the wheel standards from the baby carriage conversion, and suspending from the ceiling by a rope and spring attached to each corner. In Fig. 8, the cart with wheels in a retracted position, is shown with the handle 21 in adjusted position over the back of the front seat of an automobile. The cart is thus easily adjusted for transportation home in an automobile after the shopping tour. It still accommodates the shopping bag on the shelf and also the child on the seat with safety belt attached, if there are attendants for the child in the back seat. For traveling and so the child can see from the car, the frame work may be folded as in the case of the chair swing and placed on the front seat beside the driver. The handle 21 is removed from the standards and then adjusted over the back of the front seat and clamped by the wing nuts of the bolts 22, which will pass through the slotted portion of the handle and secure the handle to the cross pieces 14 which support the seat 16. The child is well secured by the safety belt. This is also an extremely handy device for the mother or nurse on any occasion, when alone with the child in an automobile. As illustrated in Fig. 9, by transferring the seat 16 to the end in opposition to the shelf 17, as was done in the case of the baby carriage, the frame work may by the provision of a mattress be converted into a basinette, to rest on the floor or other support. Likewise, it may also be converted to a bathinette by providing a rubberized liner, that is attached at the upper edge to the frame work, and is provided with a rubber tube drain. When it is desired to collapse the frame work into minimum space, it may be folded into compact four ply relation, as may be visualized from Fig. 10. The two sectional back member 10, by means of the hinges 11, permit the sections to fold against each other back to back, and the four side members 12, of half the width of the back member 10, each hinged by pintle and bracket hinges 13 to an edge of each section of the back member, permit them to fold against the back member, resulting in the four ply flatwise folding. The fabric cover, although heavy enough to provide a wall construction for the different devices, folds readily and naturally with the frame work. This is shown diagrammatically in Fig. 11, since it is impossible to show same in conjunction with the detailed drawings. It is shown in one piece with the back part continuous. The four pockets are open at the edges *a* and *b*. It is apparent that the cover may be easily applied, when the frame work is in the position indicated in Fig. 6. The frame work may then be positioned, as in Fig. 2, and the cover secured thereto by tie straps *c*. Grommets are provided for bolts and slits for other fastening means, as required.

From the foregoing, it is apparent that our invention meets a great need, by providing a safe and comfortable cart for a child, to make it easier for the adult while shopping or traveling. When traveling on a train, the child can be taken into the dining car on the cart and be served food on the attachable tray. On sight seeing trips or on stop overs, the value of convertibility will be apparent. The several devices, to which the cart can be converted, would if all purchased separately amount to a sum several times the cost of the cart, and would require more space and still not be as handy.

While we have shown and described a preferred form of our invention, it is obvious that many changes, which are within the scope of our invention, will be apparent to those skilled in the art. We therefore desire to be limited only by the scope of the appended claims.

What we claim is:

1. A foldable vehicle, constructed principally of hollow tubing, consisting of a two sectional back member, the parts of which are hinged to permit them to fold against each other, four side members of half width of said back member, each hinged to an edge of each section of said back member to permit them to fold thereagainst, whereby said members may be folded in four ply relation into minimum space, a key locking together contiguous edges of side members in working position, a cross piece in each top side member, a seat removably attached to said cross pieces and maintaining spaced apart relation of said side members, said seat having a removable continuous top ply extending over a substantially circular opening in said seat, a shelf removably attached to the bottom of said lower side members in working position and maintaining spaced apart relation of said side members, a removable fabric cover provided with tie straps and with openings for fastenings of vehicle parts and having a continuous back section and individual side member sections, whereby a wall construction is provided for said vehicle but still permitting a folding into four ply relation without removal of said cover, a pair of wheel standards on each side of said vehicle fixedly but removably joined to each other and to said cross pieces in said top side members, lower extremities of corresponding standards being engaged by an axle with a wheel at each end and upper extremities of corresponding standards at the top of said back member being engaged by a handle with adjustable fastenings, said wheel standards being adapted to support said vehicle structure in a horizontal as well as a vertical position, and an attachable food tray having foldable brackets turning freely in clamps and with locking projections engaging suitable openings in the front side of said top side members.

2. A convertible vehicle comprising a foldable body and a demountable running gear, said foldable body comprising a back member, four side members, a child's seat, a shopping bag shelf, an attachable food tray and a fabric wall forming cover, said back member consisting of two similar U-shaped sections of round section material hinged at their open ends to fold against each other, said side members being all of half width of said back member and of similar material and each hinged to an edge of each section of said back member to fold thereagainst, said side members having a key locking together contiguous edges of side members in erected position and a cross piece in each such top side member, said child's seat having spring detents adapted to releasably engage said cross pieces for open position of said side members and having a removable continuous top ply extending over a lower ply of said seat having a substantially circular opening, said shelf having spring detents adapted to releasably engage the bottom of said lower side members and maintain same in open position, said attachable food tray having foldable brackets turning freely in clamps and with locking projections engaging suitable recesses in the front side of said top side members, said fabric wall forming cover having openings for fastenings of vehicle parts, provided with tie straps and arranged to envelop each of side members individually to permit folding of body into a four ply relation without removal of cover, said demountable running gear comprising two pairs of wheel standards, two axles, four wheels, a handle, and fastenings for fixedly securing said running gear to and supporting said foldable body in a horizontal as well as a vertical position, each pair of said wheel standards being removably joined to each other and to respective sides of said foldable body, said axles engaging lower extremities of corresponding standards, said wheels engaging extremities of said axles and adapted to roll on a floor and support said vehicle, said handle adjustably engaging upper extremities of standards extending to the back of said vehicle, said wheel standards having adjustments whereby said wheels and handle may be placed in a retracted position for storage and for convenient transportation in an automobile.

3. A foldable vehicle consisting of a two sectional back member, the parts of which are hinged to permit them to fold against each other, four side members of half width of said back member each hinged to an edge of each section of said back member, and all adapted to fold together flatwise, a key locking together contiguous edges of side members in erected position, a seat removably attached and maintaining spaced apart relation of upper side members, said seat being of two ply construction with removable upper ply full and with a substantially circular opening in lower ply, a safety belt disposed across and above said seat having its ends respectively secured to said upper side members for preventing a child from falling from said seat, a shelf for a container removably attached to the bottom of said lower side members in erected position and maintaining spaced apart relation of said side members, a removable fabric cover provided with tie straps and with openings for fastenings of vehicle parts and having a continuous back section and individual side member sections, whereby a wall construction is provided for said vehicle but still permitting a folding together flatwise without removal of cover, an attachable food tray having foldable brackets turning freely in clamps and with locking projections engaging suitable sockets in the front side of said top side members, and means with wheels and an adjustable and removable handle, said means being detachably and adjustably arranged so that rigid support is provided for said vehicle in a horizontal as well as a vertical position, and said wheels may be retracted when not in use and in an off side position when carried in an automobile, and said means may be entirely removed to permit conversion of other members in erected and folded-in-part position to other uses for a child and the entire vehicle including the means may be collapsed and folded into a minimum space.

4. A convertible vehicle comprising a foldable body and a demountable running gear, said foldable body comprising a back member, four side members, a child's seat, a shopping bag shelf and an attachable food tray, said back member consisting of two similar U-shaped sections of round section material hinged at their open ends to fold against each other, said side members being all of half width of said back member and of similar material and each hinged to an edge of each section of said back member to fold thereagainst, said side members having a key locking together contiguous edges of side members in erected position and a cross piece in each such top side member, said child's seat having spring detents adapted to releasably engage said cross pieces for open position of said side members and having a removable continuous top ply extending over a lower ply of said seat with a substantially circular opening, said shelf having spring detents adapted to releasably engage the bottom of said lower side members and maintain same in open position, said attachable food tray having foldable brackets turning freely in clamps and with locking projections engaging suitable recesses in the front side of said top side members, said demountable running gear comprising two pair of wheel standards, two axles, four wheels, a handle, and fastenings for fixedly securing said running gear to and supporting said foldable body in a horizontal as well as a vertical position, each pair of said wheel standards being removably joined to each other and to respective sides of said foldable body, said axles engaging lower extremities of corresponding standards, said wheels engaging extremities of said axles and adapted to roll on a floor and support said vehicle, said handle adjustably engaging upper extremities of standards extending to the back of said vehicle, and means provided of a substantial fabric for said foldable body when used with as well as without said demountable running gear for forming a wall construction for said foldable body, which means securely attaches to and facilitates conversion of said foldable body to its different uses.

ROBERT D. ROLLIE.
ADA E. ROLLIE.

REFERENCES CITED

The following references are of record in the file of this patent:

FOREIGN PATENTS

| Number | Country | Date |
|---|---|---|
| 39,128 | Austria | Oct. 11, 1909 |